(12) United States Patent
Li

(10) Patent No.: US 11,812,180 B2
(45) Date of Patent: Nov. 7, 2023

(54) IMAGE PROCESSING METHOD AND APPARATUS

(71) Applicant: BEIJING BYTEDANCE NETWORK TECHNOLOGY CO., LTD., Beijing (CN)

(72) Inventor: Xiaoqi Li, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/788,907

(22) PCT Filed: Dec. 8, 2020

(86) PCT No.: PCT/CN2020/134687
§ 371 (c)(1),
(2) Date: Jun. 24, 2022

(87) PCT Pub. No.: WO2021/129385
PCT Pub. Date: Jul. 1, 2021

(65) Prior Publication Data
US 2023/0028598 A1    Jan. 26, 2023

(30) Foreign Application Priority Data
Dec. 26, 2019   (CN) .......................... 201911362278.2

(51) Int. Cl.
*H04N 5/262* (2006.01)
*H04N 23/80* (2023.01)

(52) U.S. Cl.
CPC ........... *H04N 5/2621* (2013.01); *H04N 23/80* (2023.01)

(58) Field of Classification Search
CPC ...... H04N 5/2621; H04N 23/80; H04N 5/262; G11B 27/031
See application file for complete search history.

(56) References Cited

U.S. PATENT DOCUMENTS

| 5,678,822 | A | * | 10/1997 | Setteducati | ............ | B42D 1/009 |
| | | | | | | 273/296 |
| 9,465,531 | B2 | * | 10/2016 | Miyazaki | .............. | G06F 3/0486 |
| 2004/0219980 | A1 | | 11/2004 | Bassett et al. | | |
| 2010/0153078 | A1 | * | 6/2010 | Zhang | ..................... | G06T 13/60 |
| | | | | | | 703/2 |
| 2010/0300310 | A1 | * | 12/2010 | Kanekiyo | .............. | G11B 23/40 |
| | | | | | | 101/35 |

(Continued)

FOREIGN PATENT DOCUMENTS

| CN | 101197945 A | 6/2008 |
| CN | 104427259 A | 3/2015 |

(Continued)

OTHER PUBLICATIONS

First Office Action dated Oct. 15, 2021 in CN Application No. 201911362278.2 with English Translation (13 pages).

(Continued)

*Primary Examiner* — Hung H Lam

(57) ABSTRACT

Disclosed are an image processing method and apparatus, an electronic device, and a computer readable storage medium. The method comprises: obtaining a video acquired by a photographing element; superimposing a special-effects animation on the video for display, wherein in the special-effects animation, a first special-effects material is generated at a first position in the video and starts to move from the first position, and when a second position to which the first special-effects material moves in the video is located at a feature point obtained by image edge detection in the video, the first special-effects material stays at the second position.

9 Claims, 2 Drawing Sheets

(56) References Cited

U.S. PATENT DOCUMENTS

| | | |
|---|---|---|
| 2014/0089858 A1 | 3/2014 | Yu et al. |
| 2015/0143417 A1 | 5/2015 | Zalewski |
| 2016/0196044 A1 | 7/2016 | McGill et al. |

FOREIGN PATENT DOCUMENTS

| | | |
|---|---|---|
| CN | 106373170 A | 2/2017 |
| CN | 109495695 A | 3/2019 |
| CN | 110213638 A | 9/2019 |
| JP | 2001276431 A | 10/2001 |
| JP | 2004112112 A | 4/2004 |
| JP | 2004145448 A | 5/2004 |
| JP | 201645815 | 4/2016 |

OTHER PUBLICATIONS

Second Office Action dated Apr. 13, 2022 in CN Application No. 201911362278.2 with English Translation (21 pages).

"How to shoot Douyin Douxue" Detailed explanation on how to shoot Douyin video on Douyin httpsm.shouji.com.cnnewss8668.html, Jan. 2, 2019 (1 page).

Search Report and Written Opinion dated Mar. 10, 2021 for PCT/CN2020/134687 with English Translation (11 pages).

Examination Report dated Nov. 10, 2022 in IN Application No. 202227036826 (9 pages).

Office Action dated Aug. 8, 2023 in Japanese Application No. 2022-538902, English translation (6 pages).

\* cited by examiner

IMAGE PROCESSING METHOD AND APPARATUS

CROSS-REFERENCE TO RELATED APPLICATIONS

The present application is a U.S. National Stage Application under 35 U.S.C. § 371 of International Patent Application No. PCT/CN2020/134687, filed on Dec. 8, 2020, which claims the priority to China Patent Application No. 201911362278.2 filed on Dec. 26, 2019, entitled "IMAGE PROCESSING METHOD AND APPARATUS", the entire content of both of which are incorporated herein by reference.

TECHNICAL FIELD

The present disclosure relates to an image processing method, an apparatus, and a computer readable storage medium.

BACKGROUND

With the continuous development of internet technology and image processing technology, adding special effects to images when capturing images has gradually become popular. Users can add their favorite special effects to the captured images by selecting corresponding special effect functions, thereby increasing the interest of image capturing.

However, in the prior art, special effect images realized are not vivid enough.

SUMMARY

This summary is provided for a concise introduction of the inventive concept of the present application, which will be described in detail in the detailed description below. This summary is not intended to identify critical features or essential features of the claimed technical solution, nor is it intended to be used to limit the scope of the claimed technical solution.

According to an aspect of the present disclosure, the following technical solution is provided: an image processing method, comprising: obtaining a video captured by a photographing element; and superimposing a special effect animation on the video for display; wherein in the special effect animation, a first special effect material is generated at a first position in the video and starts to move from the first position; and when a second position to which the first special effect material moves in the video is located at a feature point obtained by image edge detection in the video, the first special effect material stays at the second position.

According to an aspect of the present disclosure, the following technical solution is provided: an image processing device, comprising: a video obtaining module configured to obtain a video captured by a photographing element; and an animation superimposing module configured to superimpose a special effect animation on the video for display; wherein in the special effect animation, a first special effect material is generated at a first position in the video and starts to move from the first position; and when a second position to which the first special effect material moves in the video is located at a feature point obtained by image edge detection in the video, the first special effect material stays at the second position.

According to an aspect of the present disclosure, the following technical solution is provided: an electronic device, comprising: a memory configured to store non-transitory computer readable instructions; and a processor configured to execute the computer readable instructions, to cause the processor, when executing the instructions, to implement the image processing method according to any of the above aspects.

According to one aspect of the present disclosure, the following technical solution is provided: a computer readable storage medium on which non-transitory computer readable instructions are stored, which when executed by a computer cause the computer to implement the image processing method according to any of the above aspects.

According to another aspect of the present disclosure, the following technical solution is provided: an image processing terminal comprising the above image processing device.

BRIEF DESCRIPTION OF THE DRAWINGS

The above and other features, advantages, and aspects of the embodiments of the present disclosure will become more apparent from the following embodiments with reference to the drawings. Throughout the drawings, the same or similar reference signs indicate the same or similar elements. It should be understood that the drawings are schematic and the components and elements are not necessarily drawn to scale.

DETAILED DESCRIPTION

Exemplary embodiments of the present disclosure will now be described in detail with reference to the accompanying drawings. Although some embodiments of the present disclosure are shown, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the methods of the embodiments of the present disclosure may be executed in a different order, and/or executed in parallel. In addition, the method embodiments may comprise additional steps and/or some of the illustrated steps may be omitted. The scope of the present disclosure is not limited in this regard.

The term "comprising" and its variants as used herein is an open-ended mode expression, that is, "comprising but not limited to". The term "based on" means "based at least in part on". The term "one embodiment" means "at least one embodiment"; the term "another embodiment" means "at least one additional embodiment"; and the term "some embodiments" means "at least some embodiments". Related definitions of other terms will be given in the following description.

The present disclosure provides an image processing method to at least partially address the technical problem that the special effect images realized in the prior art are not vivid enough.

Embodiment 1

Figure 1:
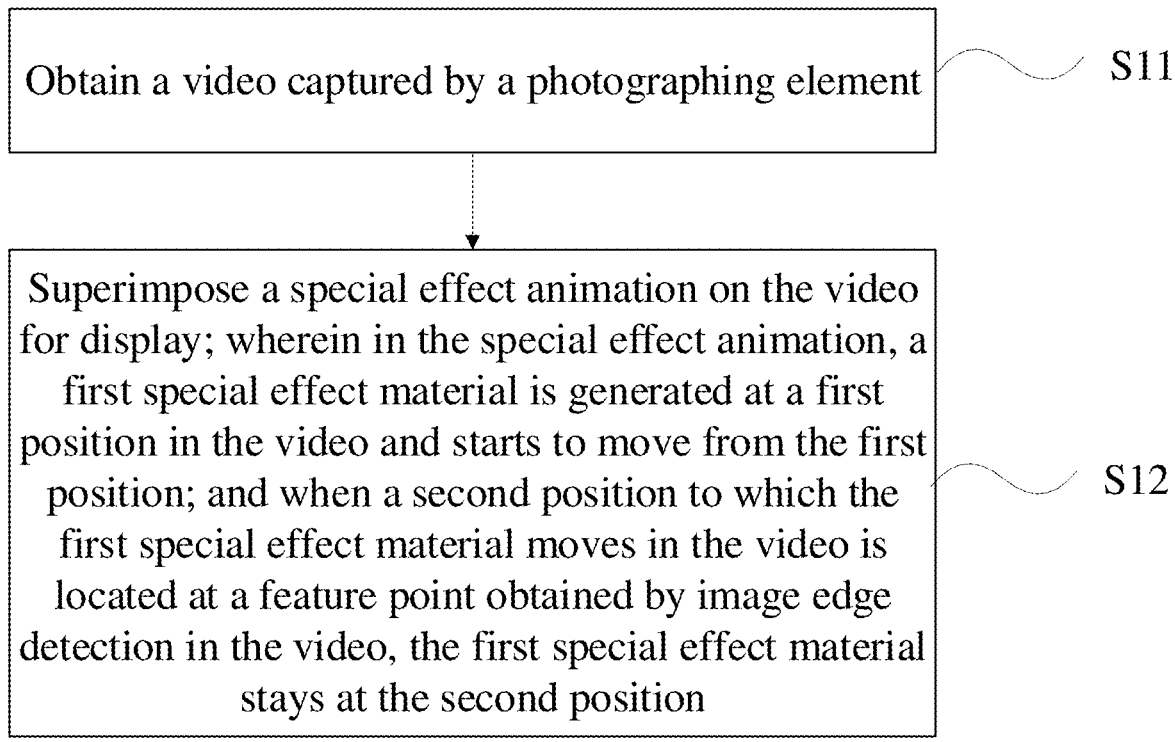
FIG. 1 is a schematic flowchart of an image processing method according to an embodiment of the present disclosure.

In order to address the technical problem that the special effect images realized in the prior art are not vivid enough, an embodiment of the present disclosure provides an image processing method. As shown in FIG. 1, the image processing method mainly comprises the following steps S11 to S12.

At step S11, a video captured by a photographing element is obtained.

The video may be a video acquired in real time, such as a livestream or a video stored locally in a terminal in advance, or a dynamic image, or an image sequence consisting of a series of static images. Specifically, the video can be acquired in real time through a camera of a terminal or a video camera, that is, a photographing element. The terminal may be a mobile terminal (for example, a smart phone, an iPhone, a tablet computer, a notebook or a wearable device), or a fixed terminal (for example, a desktop computer).

At step S12, a special effect animation is superimposed on the video for display.

Specifically, the special effect animation may start to be superimposed on a first frame image, a middle frame image, or a last frame image of the video, which is not specifically limited herein.

In the special effect animation, a first special effect material is generated at a first position in the video and starts to move from the first position; and when a second position to which the first special effect material moves in the video is located at a feature point obtained by image edge detection in the video, the first special effect material stays at the second position.

In the embodiments of the present disclosure, through obtaining a video captured by a photographing element, and superimposing a special effect animation on the video for display, wherein in the special effect animation, a first special effect material is generated at a first position in the video and starts to move from the first position, and when a second position to which the first special effect material moves in the video is located at a feature point obtained by image edge detection in the video, the first special effect material stays at the second position, a vivid dynamic special effect image can be generated.

The first special effect material may be a material with a falling special effect (for example, snowflakes, leaves, petals, etc.), or may be a material with a floating special effect (for example, bubbles, balloons, etc.). The first position may be randomly generated, or may be set on the top, bottom, middle, upper left, lower left, left, upper right, lower right, or right, etc. of the terminal screen.

The first position may also depend on properties of the first special effect material. For example, when the first special effect material is a material with a falling special effect (for example, snowflakes, leaves, petals, etc.), the first position may be any position above the bottom of the terminal screen, for example, a position at the top, middle, upper left, left, upper right, or right, etc. of the terminal screen; when the first special effect material is a material with a floating special effect (for example, bubbles, balloons, etc.), the first position can be any position below the top of the terminal screen, for example, a position at the bottom, middle, lower left, left, lower right, or right, etc. of the terminal screen.

The second position is a feature point of an image edge. Specifically, an image edge detection algorithm can be used to perform edge detection on each frame of the video to obtain an image edge, wherein the image edge is composed of feature points with a pixel value of 1. The specific image edge detection algorithm that can be used is any of the following: Sobel operator edge detection algorithm, Laplacian operator edge detection algorithm, or Canny operator edge detection algorithm, which can be selected according to the properties of the image, usage scenarios or user needs.

The Sobel operator edge detection algorithm has a better processing effect on images with grayscale gradients and heavy noise. The Sobel operator is not very accurate for edge positioning since the edge of the image has more than one pixel. The edge detection algorithm can be used when the accuracy requirement is not very high.

The Canny method is not easily disturbed by noise and can detect a real weak edge. The advantage of the Canny method is that two different thresholds are used to detect strong and weak edges separately, and that the weak edge is comprised in an output image when the weak edge is connected to the strong edge.

The Laplacian operator method is more sensitive to noise. The Laplacian Gaussian operator is a second-order derivative operator, which will produce a steep zero crossing at an edge. The Laplacian operator is isotropic and can sharpen boundaries and lines having any direction without directionality.

Specifically, the embodiment can implement the following special effect: during a video playback process, a first special effect material is generated at a first position (e.g., the top) of the terminal screen, and the first special effect material moves with the playback of the video until it moves to a second position, which is a feature point on an image edge in the video, and stops. For example, snowflake stickers are generated and fall from the top of the terminal screen.

In the embodiments of the present disclosure, through obtaining a video captured by a photographing element, and superimposing a special effect animation on the video for display, wherein in the special effect animation, a first special effect material is generated at a first position in the video and starts to move from the first position, and when a second position to which the first special effect material moves in the video is located at a feature point obtained by image edge detection in the video, the first special effect material stays at the second position, the embodiment can control the movement and stop of the special effect material according to an image edge in the video, so that an animation effect of the special effect material can be combined with the video in diverse manners, making the special effect images more vivid.

In an optional embodiment, the second position is on an image edge of a subject captured in the video.

The video may contain a plurality of subjects captured, which may be persons or any parts (comprising faces, heads, arms, etc.) of a person, animals (e.g., cat, dog, etc.), plants (e.g., trees, flowers, leaves, etc.), or the like. Specifically, the edges (for example, the edges of heads, edges of flowers, or edges of leaves) of the above subjects can be obtained by performing edge detection on the video using the above edge detection algorithm. When the first special effect material moves to an image edge of a subject in the video, the first special effect material stays at the image edge of the subject.

For example, when the first special effect material is a snowflake, a leaf, or a petal, and the second position is the edge of a human head, a special effect image of a snowflake, leaf, or petal falling on the human head can be obtained. For another example, when the first special effect material is a snowflake or a petal, and the second position is an edge of a leaf, a special effect image of a snowflake or petal falling on the leaf can be obtained.

In an optional embodiment, the second position is on an image edge of a second special effect material in a stay state in the video.

The second special effect material may be the same material as the first special effect material, or may be a different material. The generation process, moving process, and staying process of the second special effect material are similar to those of the first special effect material, which will not be repeated herein.

Specifically, when the second special effect material is the same as the first special effect material, the second position is an image edge of the first special effect material that is in the stay state in the video. For example, after the first special effect material moves to the second position and stays at the second position, the first special effect material will be used as a new edge, that is, the second position. After a subsequent first special effect material moves to the new edge, the subsequent first special effect material stays on the new edge, which can form a special effect image of material accumulation, for example, snowflake accumulation, or leaf accumulation, or petal accumulation. When the second special effect material is different from the first special effect material, for example, the first special effect material is a leaf, and the second special effect material is a snowflake or petal, a special effect image of a snowflake or petal falling on the leaf can be achieved.

In an optional embodiment, in the special effect animation, in a case where the first special effect material stays at the second position, if the feature point obtained by the image edge detection in the video changes so that the second position is not located at the feature point obtained by the image edge detection in the video, the first special effect material starts to move from the second position.

For example, when the subject contained in the video is a person or an animal, the position or action of the person or animal will change, for example, the person shakes his head or the animal runs, etc. In this case, the corresponding edge will change, and the movement of the first special effect material will also change accordingly. For example, a snowflake will continue to fall from the second position.

For another example, when the first special effect material and/or the second special effect material is a material that will dissolve after a period of time (for example, snowflakes or bubbles), the edge corresponding to these materials will also disappear, and a special effect will be formed that the material in an upper layer will fall on the edge in a lower layer, for example, a snowflake in an upper layer will fall on the edge in a lower layer; or, a special effect will be formed that the material in a lower layer will float to the edge in an upper layer, for example, a bubble in a lower layer will float to the edge in an upper layer.

In an optional embodiment, the first special effect material starting to move from the first position comprising: the first special effect material starting to move from the first position according to a first motion trajectory; and the first special effect material starting to move from the second position comprising: the first special effect material starting to move from the second position according to a second motion trajectory.

The first motion trajectory may be a horizontal motion or a vertical motion. When the first motion trajectory is the horizontal motion, a horizontal motion in a real scene may be simulated. For example, a random speed may be set in the horizontal direction. The random speed may be set within a certain range, and a direction of the random speed can be set to left or right or random. When moving horizontally, a speed in a vertical direction is 0. During the simulation, there is no force in the horizontal direction, so that the speed remains unchanged. When the first motion trajectory is the vertical motion, the effect of gravity will be simulated in the vertical direction. For example, the initial coordinates of a snowflake can be set outside the top of the screen. Due to the gravity in the vertical direction, the snowflake will slowly accelerate, and if the snowflake stays, the speed will be reset to zero. When falling again, there is no speed in the horizontal direction, and the snowflake will slowly accelerate in the vertical direction. The direction of gravity corresponds to the orientation of the terminal screen. If the screen is turned to landscape, the snowflake will move to a lateral side accordingly.

In addition, when simulating the vertical motion, since there is air resistance in the real world, and the smaller the snowflake is, the easier it is to be affected, in a specific implementation, the vertical speed of the snowflake will be adjusted by a factor less than 1 that is multiplied with the vertical speed of the snowflake. The smaller the snowflake, the smaller the value of the factor.

In an optional embodiment, in the special effect animation, the first special effect material is removed from the video when the first special effect material moves to a bottom border of the video.

Specifically, not all special effect materials can move to the image edge described above, and if a special effect material fails to move to the image edge, it will be removed from the terminal screen. The specific position from which the special effect material is removed can be determined according to the properties of the special effect material. For example, if the first special effect material is a material with a falling effect (for example, snowflakes, leaves, petals, etc.), it can be removed from the bottom of the terminal screen; if the first special effect material is a material with a floating effect (for example, bubbles, balloons, etc.), it can be removed from the top of the terminal screen.

Those skilled in the art should understand that, on the basis of the various embodiments described above, obvious modifications (for example, combinations of the listed modes) or equivalent alternatives can also be made.

In the above description, although the steps of the embodiment of the image processing method are described in the order described above, it should be clear to those skilled in the art that the steps of the embodiment of the present disclosure are not necessarily executed in the above order, and may also be performed in other orders such as reverse order, parallel, interleaved order, etc. Moreover, on the basis of the above steps, those skilled in the art can add other steps, and these apparent modifications or equivalent alternatives should also be comprised within the protection scope of the present disclosure, which will not be repeated herein.

An embodiment of a device will be given below, which can be used to execute the steps implemented by the method embodiment of the present disclosure. For the convenience of description, only the parts related to the embodiment of the present disclosure will be shown. For other specific technical details that are not described, please refer to the method embodiment of the present disclosure.

Embodiment 2

Figure 2:
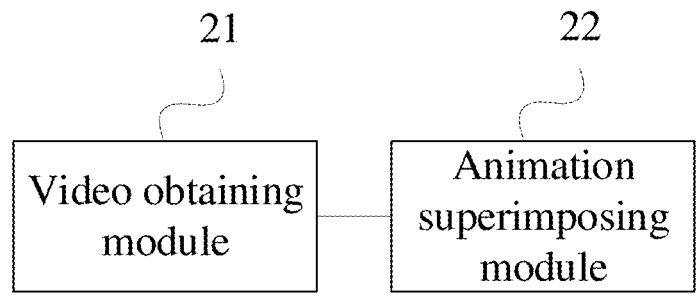
FIG. 2 is a schematic structural diagram of an image processing device according to an embodiment of the present disclosure.

In order to address the technical problem that the special effect images realized in the prior art are not vivid enough, an embodiment of the present disclosure provides an image processing device. The device may execute the steps of the image processing method described in Embodiment 1 above. As shown in FIG. 2, the device comprises: a video obtaining module 21 and an animation superimposing module 22.

The video obtaining module 21 is configured to obtain a video captured by a photographing element.

The animation superimposing module 22 is configured to superimpose a special effect animation on the video for display.

In the special effect animation, a first special effect material is generated at a first position in the video and starts to move from the first position; and when a second position to which the first special effect material moves in the video is located at a feature point obtained by image edge detection in the video, the first special effect material stays at the second position.

Further, the second position is located on an image edge of a subject captured in the video.

Further, the second position is located on an image edge of a second special effect material in a stay state in the video.

Further, the first position is a randomly determined position on a top border of the video.

Further, in the special effect animation, in a case where the first special effect material stays at the second position, if the feature point obtained by the image edge detection in the video changes so that the second position is not located at the feature point obtained by the image edge detection in the video, the first special effect material starts to move from the second position.

Further, the first special effect material starting to move from the first position comprising: the first special effect material starting to move from the first position according to a first motion trajectory; and the first special effect material starting to move from the second position comprising: the first special effect material starting to move from the second position according to a second motion trajectory.

Further, in the special effect animation, the first special effect material is removed from the video when the first special effect material moves to a bottom border of the video.

For detailed descriptions about the working principles and the technical effects achieved by the embodiment of the image processing device, reference may be made to the relevant descriptions in the embodiment of the foregoing image processing method, which will not be repeated herein.

Embodiment 3

Figure 3:
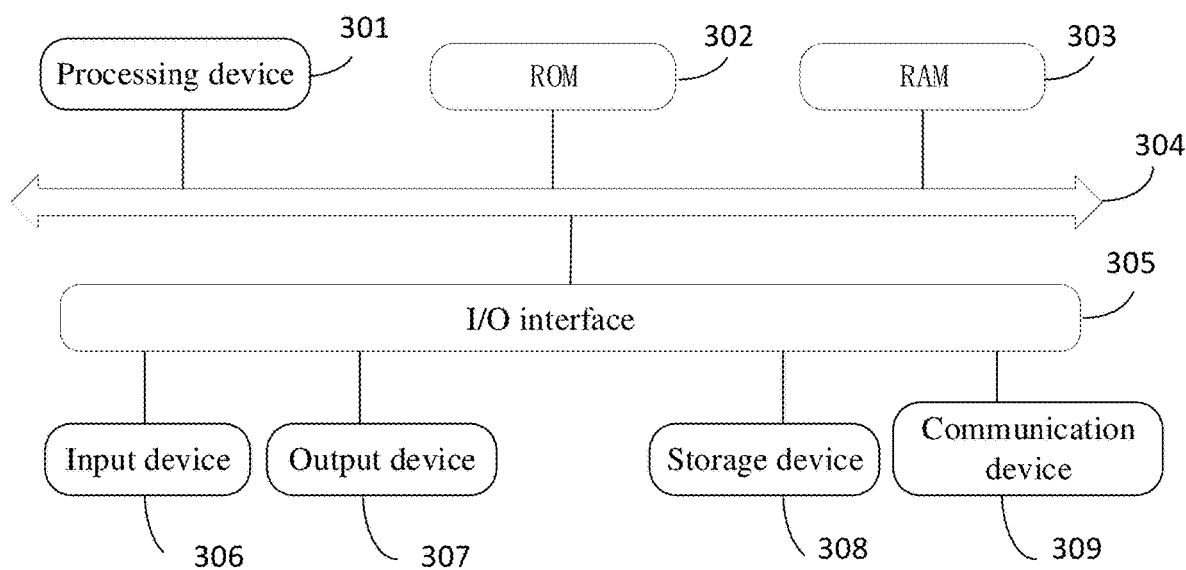
FIG. 3 is a schematic structural diagram of an electronic device according to an embodiment of the present disclosure.

Referring now to FIG. 3, a structural diagram of an electronic device 300 suitable for implementing embodiments of the present disclosure is shown. The terminal device of the embodiment of the present disclosure may comprise, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), and a fixed terminal such as a digital TV, a desktop computer, or the like. The electronic device shown in FIG. 3 is merely an example and should not impose any limitation on the function and scope of the embodiment of the present disclosure.

As shown in FIG. 3, the electronic device 300 may comprise a processing device (e.g., a central processing unit, a graphics processor) 301, which may perform various appropriate actions and processes according to a program stored in Read Only Memory (ROM) 302 or a program loaded from storage device 308 into Random Access Memory (RAM) 303. In RAM 303, various programs and data required for the operation of the electronic device 300 are also stored. The processing device 301, ROM 302 and RAM 303 are connected to each other through bus 304. Input/Output (I/O) interface 305 is also connected to bus 304.

Generally, the following devices can be connected to I/O interface 305: an input device 306 comprising, for example, a touch screen, a touch pad, a keyboard, a mouse, a camera, a microphone, an accelerometer, a gyroscope, etc.; an output device 307 comprising a liquid crystal display (LCD), a speaker, a vibrator, etc.; a storage device 308 comprising, for example, a magnetic tape, a hard disk, etc.; and a communication device 309. The communication device 309 enables the electronic device 300 to communicate wirelessly or by wire with other devices to exchange data. Although FIG. 3 shows the electronic device 300 with various components, it should be understood that it is not required to implement or have all of these components. Alternatively, more or fewer components can be implemented or provided.

In particular, according to an embodiment of the present disclosure, the processes described above with reference to the flowchart can be implemented as a computer software program. For example, an embodiment of the present disclosure comprises a computer program product, which comprises a computer program carried on a non-transitory computer readable medium, the computer program containing program code for executing the method shown in the flowchart. In such an embodiment, the computer program may be downloaded and installed from the network through the communication device 309, or installed from the storage device 308, or installed from the ROM 302. When the computer program is executed by the processing device 301, the above functions defined in the method of the embodiment of the present disclosure are performed.

It should be noted that the computer readable medium in the present disclosure may be a computer readable signal medium or a computer readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may comprise, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, which can be used by or in connection with an instruction execution system, apparatus or device. In the present disclosure, a computer readable signal medium may comprise a data signal that is propagated in the baseband or as part of a carrier, carrying computer readable program code. Such propagated data signals can take a variety of forms comprising, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, comprising but not limited to wire, optic cable, RF (radio frequency), etc., or any suitable combination of the foregoing.

In some embodiments, a client and a server can communicate using any currently known or future developed network protocol such as HTTP (HyperText Transfer Protocol), and can be interconnected by any form or medium of digital data communication, e.g., a communication network. Examples of communication networks comprise a local area network ("LAN") and a wide area network ("WAN"), the Internet, and end-to-end networks (for example, ad hoc end-to-end networks), as well as any currently known or future developed networks.

The above computer readable medium may be comprised in the electronic device described above; or it may exist alone without being assembled into the electronic device.

The computer readable medium carries one or more programs that cause, when the one or more programs executed by the electronic device, the electronic device is made to perform the following steps: obtaining a video captured by a photographing element; and superimposing a special effect animation on the video for display; wherein in the special effect animation, a first special effect material is generated at a first position in the video and starts to move from the first position; and when a second position to which the first special effect material moves in the video is located at a feature point obtained by image edge detection in the video, the first special effect material stays at the second position.

The computer program code for executing operations of the present disclosure may be complied by any combination of one or more program design languages, the program design languages comprising, but not limited to, object-oriented program design languages, such as Java, Smalltalk, C++, etc., as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the case of the remote computer, the remote computer may be connected to the user computer through various kinds of networks, comprising local area network (LAN) or wide area network (WAN), or connected to external computer (for example using an internet service provider via Internet).

The flowcharts and block diagrams in the figures illustrate the architecture, functionality, and operation of some possible implementations of systems, methods and computer program products in accordance with various embodiments of the present disclosure. In this regard, each block in the flowchart or block diagrams may represent a module, segment, or portion of code, which comprises one or more executable instructions for implementing the specified function or functions. It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units involved in the embodiments described in the present disclosure can be implemented in software or hardware. The name of a unit does not constitute a limitation of the unit itself under certain circumstances, for example, a first acquisition unit may also be described as "a unit that obtains at least two Internet Protocol addresses".

The functions described above may be performed at least in part by one or more hardware logic components. For example, without limitation, exemplary types of hardware logic components that can be used comprise: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of thereof. More specific examples of the machine-readable storage medium may comprise electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

According to one or more embodiments of the present disclosure, an image processing method is provided, comprising: obtaining a video captured by a photographing element; and superimposing a special effect animation on the video for display; wherein in the special effect animation, a first special effect material is generated at a first position in the video and starts to move from the first position; and when a second position to which the first special effect material moves in the video is located at a feature point obtained by image edge detection in the video, the first special effect material stays at the second position.

Further, the second position is on an image edge of a subject captured in the video.

Further, the second position is on an image edge of a second special effect material in a stay state in the video.

Further, the first position is a randomly determined position on a top border of the video.

Further, in the special effect animation, in a case where the first special effect material stays at the second position, if the feature point obtained by the image edge detection in the video changes so that the second position is not located at the feature point obtained by the image edge detection in the video, the first special effect material starts to move from the second position.

Further, the first special effect material starting to move from the first position comprising: the first special effect material starting to move from the first position according to a first motion trajectory; and the first special effect material starting to move from the second position comprising: the first special effect material starting to move from the second position according to a second motion trajectory.

Further, in the special effect animation, the first special effect material is removed from the video when the first special effect material moves to a bottom border of the video.

According to one or more embodiments of the present disclosure, an image processing device is provided, comprising: a video obtaining module configured to obtain a video captured by a photographing element; and an animation superimposing module configured to superimpose a special effect animation on the video for display; wherein in the special effect animation, a first special effect material is generated at a first position in the video and starts to move from the first position; and when a second position to which the first special effect material moves in the video is located at a feature point obtained by image edge detection in the video, the first special effect material stays at the second position.

Further, the second position is on an image edge of a subject captured in the video.

Further, the second position is on an image edge of a second special effect material in a stay state in the video.

Further, the first position is a randomly determined position on a top border of the video.

Further, in the special effect animation, in a case where the first special effect material stays at the second position, if the feature point obtained by the image edge detection in the video changes so that the second position is not located at the feature point obtained by the image edge detection in the video, the first special effect material starts to move from the second position.

Further, the first special effect material starting to move from the first position comprising: the first special effect material starting to move from the first position according to a first motion trajectory; and the first special effect material starting to move from the second position comprising: the first special effect material starting to move from the second position according to a second motion trajectory.

Further, in the special effect animation, the first special effect material is removed from the video when the first special effect material moves to a bottom border of the video.

According to one or more embodiments of the present disclosure, an electronic device is provided, comprising: a memory configured to store non-transitory computer readable instructions; and a processor configured to execute the computer readable instructions, to cause the processor, when executing the instructions, to implement the image processing method described above.

According to one or more embodiments of the present disclosure, a computer readable storage medium is provided, on which non-transitory computer readable instructions are stored, which when executed by a computer cause the computer to implement the image processing method described above.

The above description is only preferred embodiments of the present disclosure and an explanation of the applied technical principles. Those skilled in the art should understand that the scope of disclosure involved in the disclosure is not limited to the technical solutions formed by the specific combination of the above technical features, and should also cover other technical solutions formed by any combination of the above technical features or their equivalent features without departing from the disclosed concept. For example, technical solutions formed by replacing the above features with technical features having similar functions to those disclosed in the present disclosure (but not limited to).

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are comprised in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. An image processing method, comprising:
obtaining a video captured by a photographing element; and
superimposing a special effect animation on the video for display;
wherein in the special effect animation, a first special effect material is generated at a first position in the video and starts to move from the first position; and when a second position to which the first special effect material moves in the video is located at a feature point obtained by image edge detection in the video, the first special effect material stays at the second position.

2. The method according to claim 1, wherein the second position is on an image edge of a subject captured in the video.

3. The method according to claim 1, wherein the second position is on an image edge of a second special effect material in a stay state in the video.

4. The method according to claim 1, wherein the first position is a randomly determined position on a top border of the video.

5. The method according to claim 1, wherein in the special effect animation, in a case where the first special effect material stays at the second position, if the feature point obtained by the image edge detection in the video changes so that the second position is not located at the feature point obtained by the image edge detection in the video, the first special effect material starts to move from the second position.

6. The method according to claim 5, wherein the first special effect material starting to move from the first position comprising: the first special effect material starting to move from the first position according to a first motion trajectory; and
the first special effect material starting to move from the second position comprising: the first special effect material starting to move from the second position according to a second motion trajectory.

7. The method according to claim 1, wherein in the special effect animation, the first special effect material is removed from the video when the first special effect material moves to a bottom border of the video.

8. An electronic device, comprising:
- a memory configured to store non-transitory computer readable instructions; and
- a processor configured to execute non-transitory the computer readable instructions, to cause the processor, when executing the instructions, to implement the image processing method according to claim 1.

9. A non-transitory computer readable storage medium on which non-transitory computer readable instructions are stored, which when executed by a computer cause the computer to implement the image processing method according to claim 1.

* * * * *